F. W. HOWARD.
AUTOMOBILE WHEEL.
APPLICATION FILED JULY 29, 1916.
1,247,681.
Patented Nov. 27, 1917.
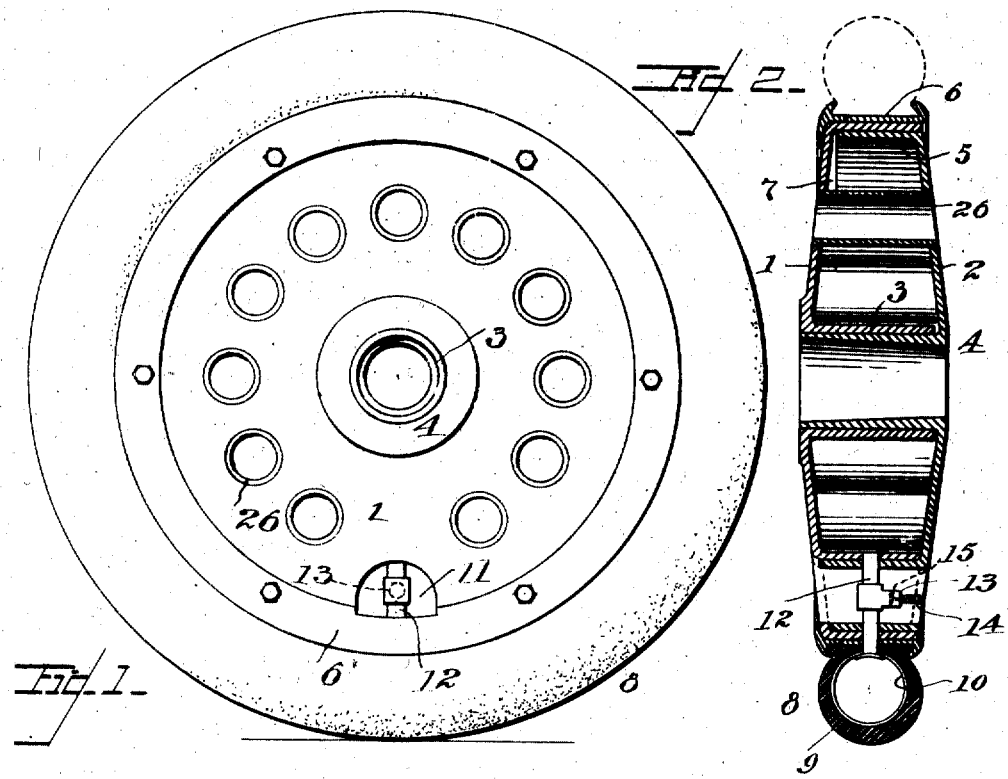
Frank W. Howard
by Francis D. Ammen
his Atty.

UNITED STATES PATENT OFFICE.

FRANK W. HOWARD, OF NEW YORK, N. Y.

AUTOMOBILE-WHEEL.

1,247,681.  Specification of Letters Patent.  Patented Nov. 27, 1917.

Application filed July 29, 1916. Serial No. 111,972.

*To all whom it may concern:*

Be it known that I, FRANK W. HOWARD, a citizen of the United States, and resident of New York city, in the county of New York and State of New York, have invented certain new and useful Improvements in Automobile-Wheels, of which the following is a specification.

This invention relates to automobile wheels, and the general object of the invention is to provide means tending to prevent the occurrence of blow-outs in pneumatic tires. A large percentage of such blow-outs are due to the fact that when an automobile is running, the compressed air in the tires becomes heated. This heating of the air raises its pressure, often to a point sufficiently high to cause a blow-out. I provide a construction whereby the air within the tire is maintained in a relatively cool state. To this end I provide an air reservoir in the wheel body and maintain the interior of this reservoir in communication with the interior of the tire. The walls of the air reservoir, if composed of a heat conducting material, radiate the heat which is given to them by the air contained in the reservoir, so that in this way the whole body of air is maintained at a relatively lower temperature than is usual in an ordinary pneumatic tire.

In the drawing which fully illustrates an embodiment of my invention,

Figure 1 is a side elevation of a wheel constructed in accordance with my invention; Fig. 2 is a vertical section through the wheel shown in Fig. 1.

According to my invention the body of the wheel is formed with walls of conducting material which operate to form a reservoir. When the automobile wheel is in use the tire constantly strikes projections in the roadway and these cause sudden and continuous variations in the volume of the tire. During each reduction of the volume of the tire, air is forced from the tire into the reservoir, and vice versa. This causes a circulation of the air, and the effect is augmented by the centrifugal forces developed in the air in the reservoir and also by the fact that the wheel is continuously turning over.

The wheel is preferably formed of two side plates which engage each other and are connected together at the wheel hub and which also engage each other and are connected together adjacent the wheel rim. In order to accomplish this, I may adopt a construction such as that shown in Figs. 1 and 2, in which the body of the wheel is formed of two slightly dished disks 1 and 2 which are preferably formed at their hub portions with central telescoping cylindrical sleeves 3 which come together at the hub 4 of the wheel. The outer or rim portions of these side plates are preferably integral with the hub portions, engage each other and are connected together. For this purpose the outer edges of the disks 1 and 2 have telescoping cylindrical flanges 5, and on the outermost of these flanges, the independently removable rim 6 of the wheel seats. In this way the two disks 1 and 2 operate to inclose an inner space or reservoir 7. On the rim 6 there is mounted a pneumatic tire 8 of any suitable construction. The tire illustrated comprises a case 9 and an inner tube 10. In order to effect a connection between the inner tube 10 and the reservoir 7, I prefer to construct the wheel with a gap or opening 11 in which I connect the inner tube with the reservoir by a suitable duct or tubular connection 12, which is constantly open. This connection has a laterally disposed branch 13 which includes an inflating nipple 14, the cap of which is supposed to be removed, (see Fig. 2). This branch 13 includes a valve 15 which opens inwardly. By attaching an air-supply connection to the inflating nipple 14, the valve 15 will open and air will flow in under pressure and simultaneously fill the reservoir 7 and the pneumatic tire 8.

If it is desired to increase the radiating effect of the reservoir in the construction shown in Fig. 1, I may provide the wheel with means for this purpose, in the form of a plurality of open transverse tubes 26 of relatively large diameter, which enable the outer air to circulate freely through the wheel. The wall of these tubes may be relatively thin so that their efficiency as radiators will be relatively high. These crosstubes also operate as stays or braces for the side plates or disks 1 and 2 and when they are employed, they enable side plates of lighter weight to be used to construct the wheel.

It is understood that the embodiment of the invention described herein is only one of the many embodiments this invention may take and I do not wish to be limited in the practice of the invention nor in my claims to the particular embodiment set forth,

What I claim is:

1. An automobile wheel having a wheel body consisting of two side plates engaging each other and connected together at the hub portion of the wheel, said plates extending outwardly from the hub portion and having rim portions integral respectively with the hub portions, said rim portions engaging each other and connected together at the wheel rim, said plates operating to inclose an air tight reservoir, a plurality of transversely disposed tubes extending through said plates and bracing said plates, and through which the atmosphere may pass to cool the air in the reservoir, and a pneumatic tire on said wheel body having a constantly open duct for continuously maintaining communication between the interior of said tire and the interior of said reservoir.

2. An automobile wheel having a wheel body consisting of two side plates connected at the hub of the wheel by a sleeve integral with one of said plates, said sleeve forming a hub portion for said wheel, said plates having integral rim portions engaging each other and connected together at the rim of the wheel, said plates coöperating to form an air reservoir, a tire on said wheel body removable from the wheel independently of said side plates and a constantly open duct for continuously maintaining communication between the interior of said tire and the interior of said reservoir.

3. An automobile wheel having a wheel body consisting of two side plates connected at the hub of the wheels by a sleeve integral with one of said plates, said sleeve forming a hub portion for said wheel, said plates having integral rim portions engaging each other and connected together at the rim of the wheel and coöperating to form an air reservoir, a tire on said wheel body removable from the wheel independently of said side plates and a constantly open duct for continuously maintaining communication between the interior of said tire and the interior of said reservoir, and means connecting said plates to permit the passage of air therethrough, and thereby increasing the radiating effect of the walls of said reservoir.

4. An automobile wheel having a wheel body consisting of two side plates having integral telescoping sleeves at the hub of the wheel, said side plates being connected together at the rim of the wheel and forming an air reservoir, a pneumatic tire on said wheel body, said wheel body having a gap formed therein adjacent the rim thereof, and a tubular connection in said gap constantly maintaining open communication between the interior of said pneumatic tire and said reservoir, and an inflating nipple for simultaneously inflating said tire and charging said reservoir.

5. An automobile wheel having a wheel body consisting of two plates having integral telescopic sleeves at the hub of the wheel, said plates being connected together at the rim of the wheel and inclosing an air reservoir, a plurality of transversely disposed tubes passing through said side plates for conducting atmospheric air through the wheel body to cool the air in the reservoir, a pneumatic tire on said wheel body, said wheel body having a gap formed therein adjacent to the rim thereof, a tubular connection in said gap constantly maintaining open communication between the interior of said pneumatic tire and said reservoir, and an inflating nipple for inflating said tire and charging said reservoir.

Signed at New York city in the county of New York and State of New York this 24th day of July, A. D. 1916.

FRANK W. HOWARD.